No. 820,462. PATENTED MAY 15, 1906.
J. B. WILLARD.
HINGE.
APPLICATION FILED SEPT. 7, 1905.
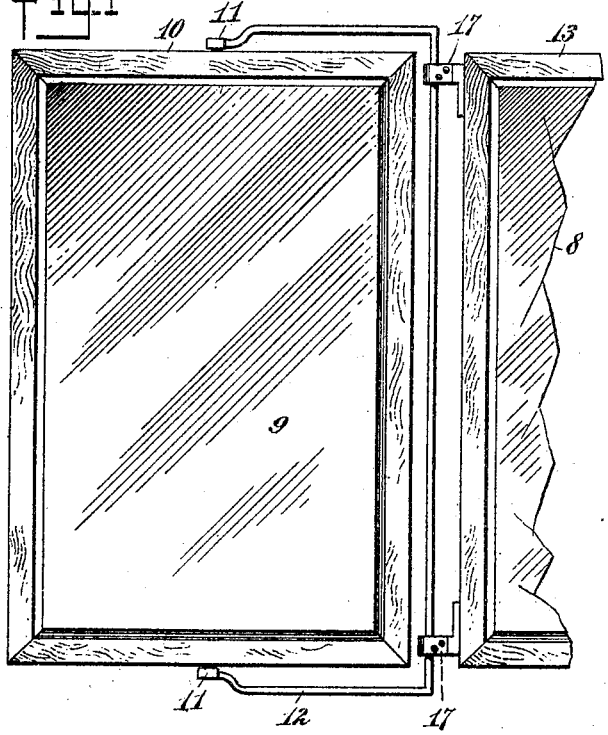
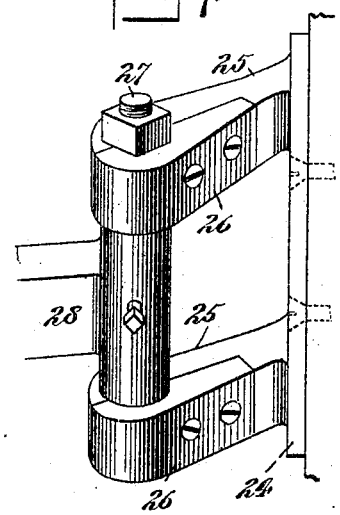
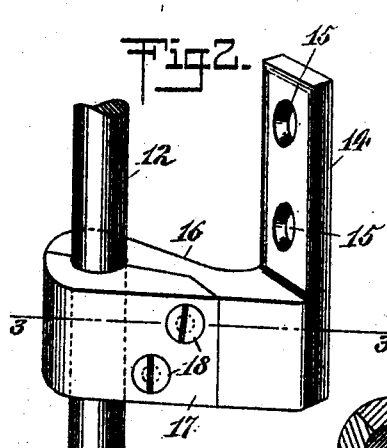
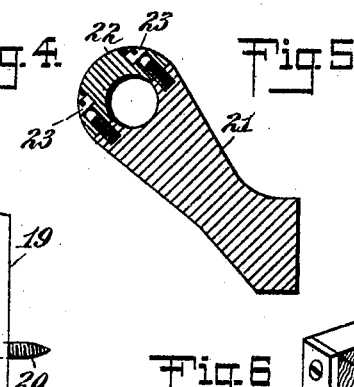
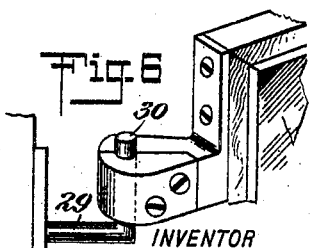
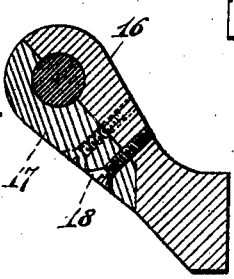
WITNESSES:
M. Van Nortwick
N. B. Smith
INVENTOR
John B. Willard
BY his ATTORNEY
George Cook

UNITED STATES PATENT OFFICE.

JOHN B. WILLARD, OF NEW YORK, N. Y.

HINGE.

No. 820,462. Specification of Letters Patent. Patented May 15, 1906.

Application filed September 7, 1905. Serial No. 277,281.

*To all whom it may concern:*

Be it known that I, JOHN B. WILLARD, a citizen of the United States, and a resident of New York, borough of Brooklyn, in the county of Kings and State of New York, have made and invented certain new and useful Improvements in Hinges, of which the following is a specification.

My invention relates to an improvement in hinges, and more particularly those adapted for use in connection with folding mirrors, the object of the same being to provide a device of this character so constructed and arranged that the hinge when properly adjusted in connection with the pintle or supporting-rod will hold the mirror in any desired position even when standing upon an uneven floor or support.

A further object of my invention is to so construct and arrange the hinge that it may be easily and readily secured to the pintle or supporting-rod and whereby its gripping or binding action thereon may be adjusted.

With these and other ends in view the invention consists in certain novel features of construction and combinations of parts, as will be hereinafter fully described, and pointed out in the claims.

In the accompanying drawings, Figure 1 is a view in elevation of a part of a triplicate mirror, my improved hinge being applied thereto. Fig. 2 is an enlarged view of the detached hinge, showing a part of the pintle-rod. Fig. 3 is a sectional view thereof, taken on the line 3 3 of Fig. 2. Figs. 4, 5, 6, and 7 are views of modifications.

Referring to the drawings, 8 represents a part of the central mirror of a triplicate mirror, and 9 one of the end mirrors, the latter having its frame 10 pivoted between the bent ends 11 of the pintle bar or rod 12, which forms one member of my hinge. To the frame 13 of the central mirror 8 are secured hinge members, as illustrated in Figs. 2 and 3, through which the pintle-rod 12 passes in order to support the end mirror. Each of these hinge members preferably consists of two parts, one part or section thereof comprising a vertical plate 14, provided with holes or openings 15, through which pass screws for securing the hinge member to the mirror-frame, an arm 16 extending outwardly therefrom and at an angle therewith, the outer portion or end of said arm being recessed or cut away to receive the other portion or section 17 of the hinge member, the outer surface thereof lying flush with the outer side or surface of the arm 16 in order to lend a neat and finished appearance to the article.

In the sections 16 and 17 are formed threaded openings to receive the binding-screws 18 and by means of which the two sections of the hinge member may be made to more or less tightly bind or clamp between them the pintle-rod 12, both the arm 16 and binding or tension plate 17 being formed with rounded recesses to accommodate said pintle-rod.

In mirrors hung in the ordinary manner, both single, double, and triplicate mirrors, it has heretofore been difficult to hold them in their proper relative positions, especially when not properly supported on the floor, the tendency being for the mirrors to turn or swing when held out of the vertical. By means of my improved hinge member, however, this objection is overcome, as by slightly turning the screws 18 the binding or tension plate 17 may be caused to more tightly grip or bind the pintle-rod 12 between it and the arm 16, the tension thereon being sufficient to prevent any accidental swinging or turning of said rod in the hinge member and holding the mirror in any position in which it may be turned or placed. Furthermore, by forming the hinge member in sections, as described, the mirrors if made in the double or triplicate form may be easily and quickly separated by removing the screws 18 and the binding or tension plate 17.

If desired, the hinge member may be constructed as illustrated in Fig. 4—that is, the plate 19 may be constructed in section, as well as the arm extending therefrom and one or more binding-screws 20 passed through both sections in order to hold the latter together and at the same time secure the hinge member to the mirror-frame. Again, the hinge member may be constructed as shown in Fig. 5—that is, by forming the extreme end of the arm 21 with the removable piece 22 and employing the screws 23 for securing the two parts together, or, if desired, a double hinge member may be formed, as illustrated in Fig. 7, wherein the plate 24 has formed integral therewith two arms 25, each provided with a binding or tension plate 26, as described in the first instance, the pintle 27 extending between both arms of the hinge member and provided with the arm or bracket 28 to secure the same to the mirror-frame.

It will be understood, of course, that I do not limit the use of my invention to a double or triplicate mirror, as it is perfectly adapted for use upon a single mirror, as illustrated in Fig. 6, a bent pintle-bar 29 secured at one end to the wall or other support and having its vertical part or portion 30 extending up through the hinge member and engaging therewith in every way the same as described in the first instance, the mirror being adapted to more or less freely swing thereon in accordance with the adjustment of the tension-plate thereon.

Having fully described my invention, what I claim as new, and desire to secure by Letters Patent, is—

1. A hinge member comprising an attaching-plate having an arm portion projecting substantially at right angles from one end, said arm portion being, also, inclined transversely and having one face recessed for a portion of its length, said recessed portion having a segmental groove, and a binding-plate of less length than the arm, fitting within the recessed portion of said arm and having a segmental groove in its inner face adapted to register with the like groove in the arm and form a bearing for the pintle, and means for securing the plate to the arm.

2. A hinge member comprising an attaching-plate having an arm projecting in a plane substantially at right angles thereto, said arm being, also, inclined in a plane substantially at right angles to the plane of its projection, and having a segmental groove in its inner face, and a binding-plate fitting against the arm and having a segmental groove adapted to register with the groove in the arm and thereby form a bearing for the pintle member of the hinge.

Signed at New York, borough of Manhattan, in the county of New York and State of New York, this 6th day of September, A. D. 1905.

JOHN B. WILLARD.

Witnesses:
  GEORGE COOK,
  M. VAN NORTWICK.